United States Patent [19]

McGuire

[11] Patent Number: 5,330,251
[45] Date of Patent: Jul. 19, 1994

[54] RETRACTABLE SEAT COVER APPARATUS

[76] Inventor: Karen A. McGuire, 195 Logan Rd., Gibsonia, Pa. 15044

[21] Appl. No.: 48,314

[22] Filed: Apr. 19, 1993

[51] Int. Cl.$^5$ .............................................. A47C 31/11
[52] U.S. Cl. ................................ 297/229; 297/184.1; 297/184.11; 297/217; 160/370.2 A
[58] Field of Search ............ 297/184.1, 184.11, 219.1, 297/229; 160/368.1, 370.2 A, DIG. 13; 296/97.8

[56] References Cited

U.S. PATENT DOCUMENTS

| 2,804,914 | 9/1957 | Butcko et al. | 297/229 |
| 4,118,066 | 10/1978 | Ricke | 297/184.11 |
| 4,134,616 | 1/1979 | Christensen | 297/229 X |
| 4,320,922 | 3/1982 | Meritis | 297/229 X |
| 4,600,238 | 7/1986 | Goodford | 297/229 X |
| 4,790,592 | 12/1988 | Busso et al. | 297/229 X |
| 5,024,479 | 6/1991 | Bryngelson | 297/97.8 X |

FOREIGN PATENT DOCUMENTS 420511 11/1910 France ................................ 297/229

Primary Examiner—Peter R. Brown
Attorney, Agent, or Firm—E. Michael Combs

[57] ABSTRACT

A seat cover assembly is arranged for adherence interior surface of a vehicular window permitting the extension and retraction of a seat cover over an associated vehicular seat adjacent the rear window.

4 Claims, 4 Drawing Sheets

RETRACTABLE SEAT COVER APPARATUS

BACKGROUND OF THE INVENTION

1. Field of the Invention

The field of invention relates to seat cover apparatus, and more particularly pertains to a new and improved retractable seat cover apparatus arranged for the selective extension over a seat outer surface.

2. Description of the Prior Art

Seat cover structure is indicated in the prior art and exemplified by the U.S. Pat. Nos. 4,600,238; 4 790,592; 4,955,665; and 4,969,683.

The instant invention attempts to overcome deficiencies of the prior art by providing for a retractable seat cover structure arranged for retrofit and mounting to a vehicular rear window for extension selectively over an adjacent seat member and this respect, the present invention substantially fulfills this need.

SUMMARY OF THE INVENTION

In view of the foregoing disadvantages inherent in the known types of seat cover structure now present in the prior art, the present invention provides a retractable seat cover apparatus wherein the same includes a mounting housing arranged for securement and adjacency to a vehicular rear window. As such, the general purpose of the present invention, which will be described subsequently in greater detail, is to provide a new and improved retractable seat cover apparatus which has all the advantages of the prior art seat cover apparatus and none of the disadvantages.

To attain this, the present invention provides a seat cover assembly arranged for adherence to the interior surface of a vehicular window permitting the extension and retraction of a seat cover over an associated vehicular seat adjacent the rear window.

My invention resides not in any one of these features per se, but rather in the particular combination of all of them herein disclosed and claimed and it is distinguished from the prior art in this particular combination of all of its structures for the functions specified.

There has thus been outlined, rather broadly, the more important features of the invention in order that the detailed description thereof that follows may be better understood, and in order that the present contribution to the art may be better appreciated. There are, of course, additional features of the invention that will be described hereinafter and which will form the subject matter of the claims appended hereto. Those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

It is therefore an object of the present invention to provide a new and improved retractable seat cover apparatus which has all the advantages of the prior art seat cover apparatus and none of the disadvantages.

It is another object of the present invention to provide a new and improved retractable seat cover apparatus which may be easily and efficiently manufactured and marketed.

It is a further object of the present invention to provide a new and improved retractable seat cover apparatus which is of a durable and reliable construction.

An even further object of the present invention is to provide a new and improved retractable seat cover apparatus which is susceptible of a low cost of manufacture with regard to both materials and labor, and which accordingly is then susceptible of low prices of sale to the consuming public, thereby making such retractable seat cover apparatus economically available to the buying public.

Still yet another object of the present invention is to provide a new and improved retractable seat cover apparatus which provides in the apparatuses and methods of the prior art some of the advantages thereof, while simultaneously overcoming some of the disadvantages normally associated therewith.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there is illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein.

DESCRIPTION OF THE PREFERRED EMBODIMENT

Figure 1:
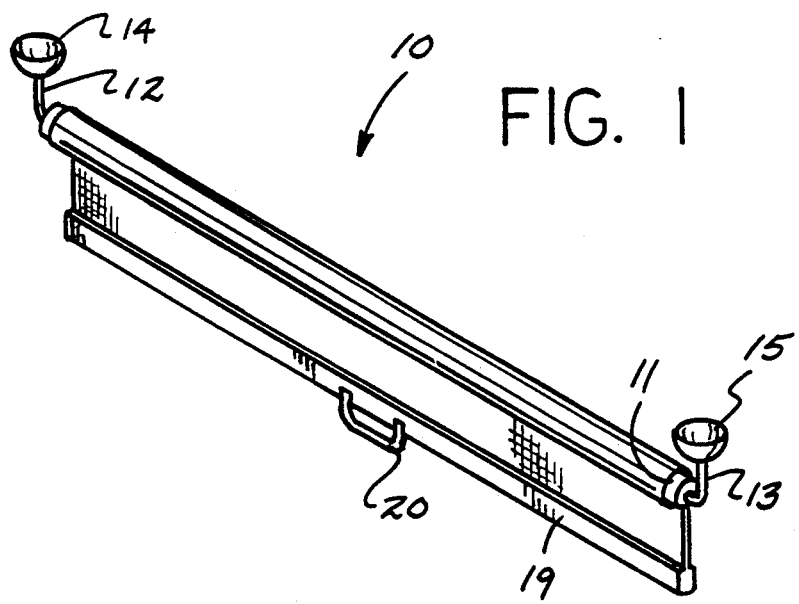
FIG. 1 is an isometric illustration of the invention.

With reference now to the drawings, and in particular to FIGS. 1 to 8 thereof, a new and improved retractable seat cover apparatus embodying the principles and concepts of the present invention and generally designated by the reference numeral 10 will be described.

Figure 2:
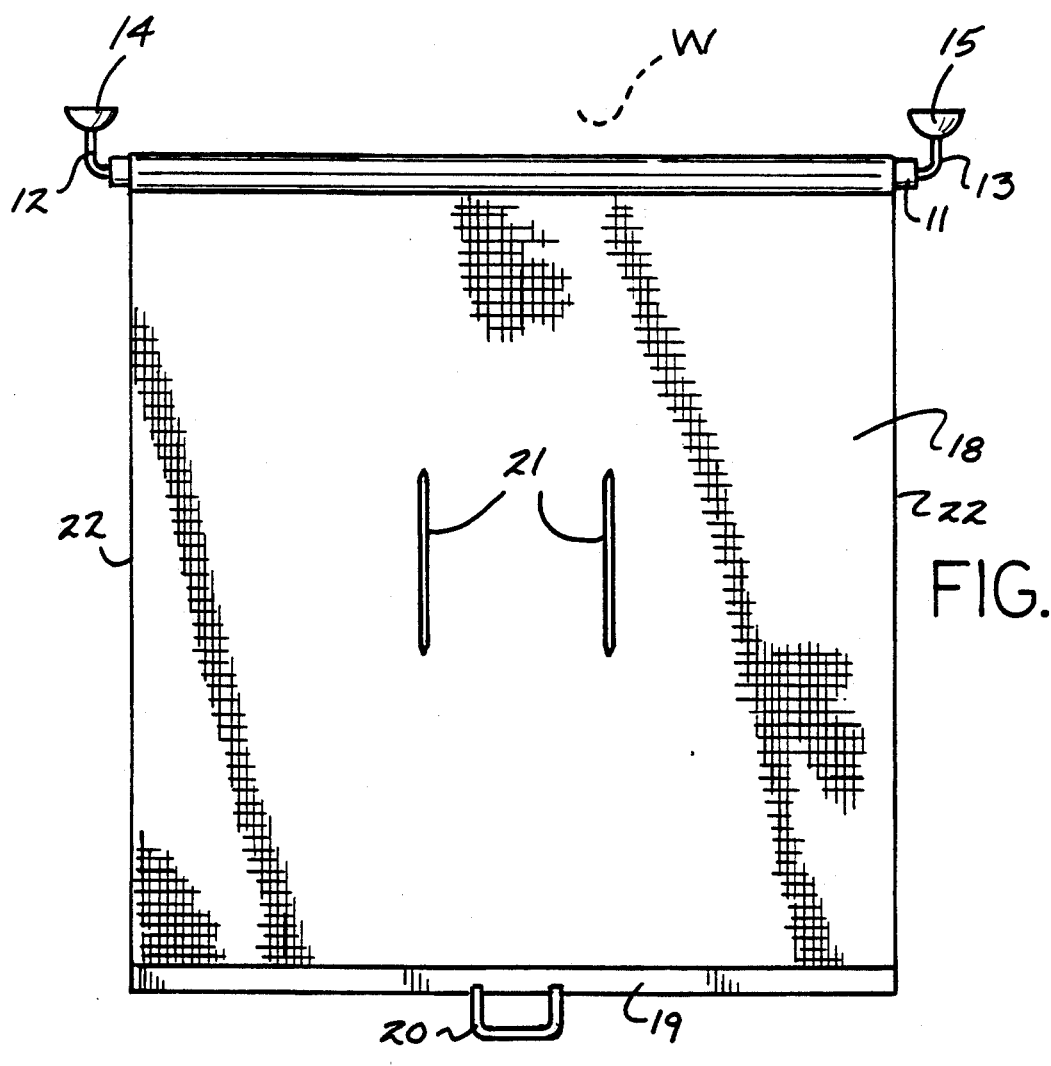
FIG. 2 is an orthographic top view of the invention.
Figure 3:
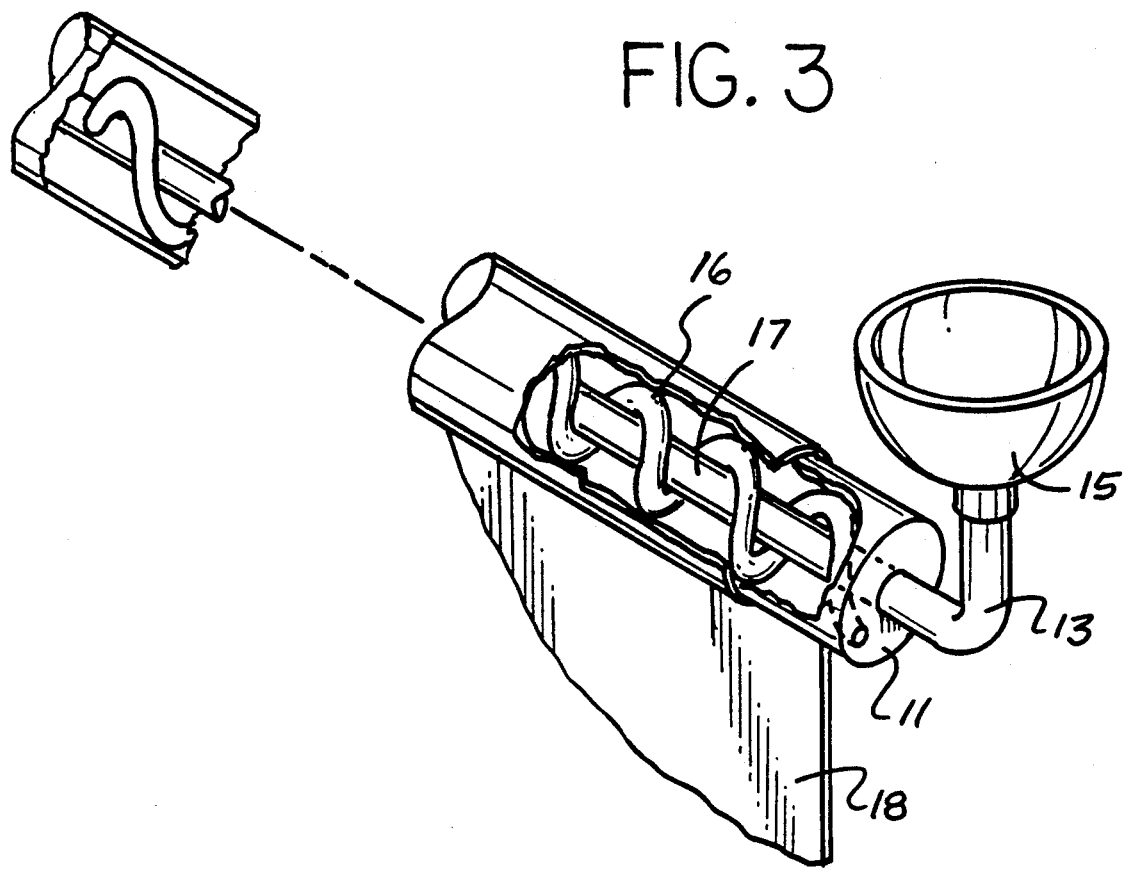
FIG. 3 is an isometric sectional view indicating the retraction spring within the housing structure.
Figure 4:
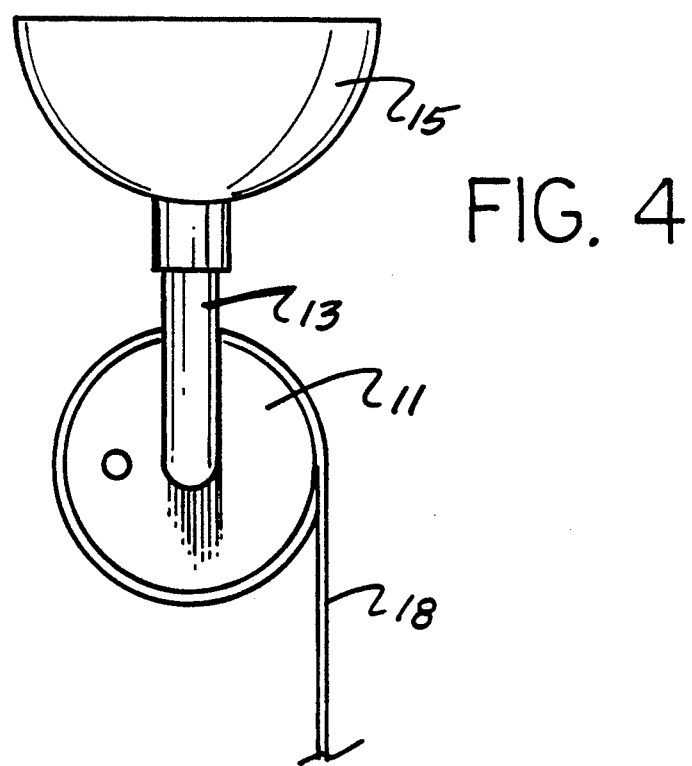
FIG. 4 is an orthographic end view of the invention.
Figure 5:
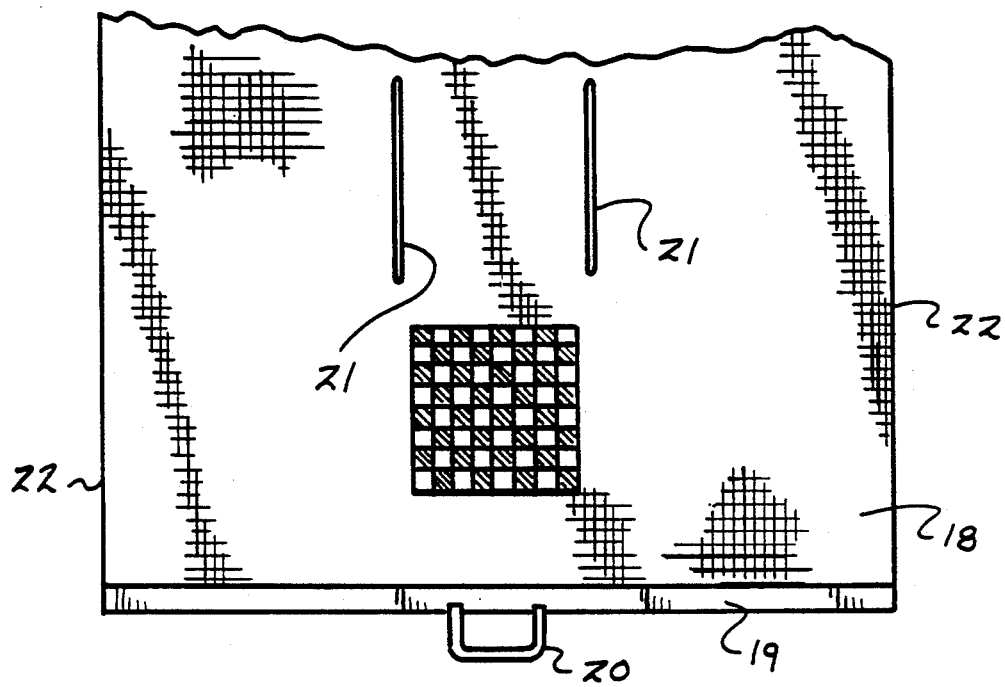
FIG. 5 is an orthographic top view of the web structure, including a removable game board portion.
Figure 6:
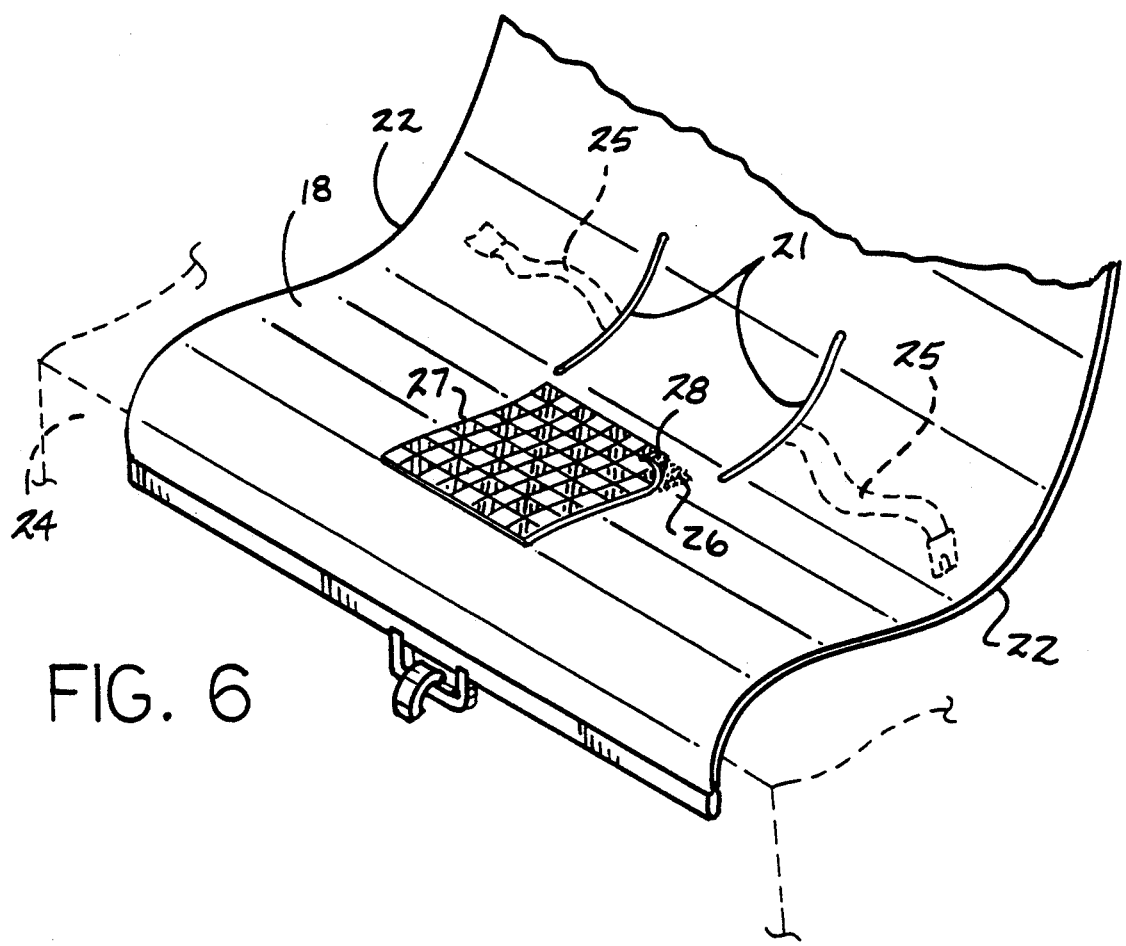
FIG. 6 is an isometric illustration of the invention indicating the game board portion mounted to the seat cover structure.

More specifically, the retractable; seat cover apparatus 10 of the instant invention essentially comprises a cylindrical housing 11 rotatably mounted about a connecting axle 17, that includes first and second support rods 12 and 13 orthogonally and fixedly mounted to tile axle at opposed ends of the axle, with the housing 11 oriented between the first and second support rods 12 and 13, as illustrated for example in the FIGS. 1 and 2. Respective first and second suction cup members 14 and 15 are mounted to the first and second support rods for securement to a vehicular rear window "W", as indicated in FIG. 2. A retraction spring 16 has the spring first end secured to the housing 11, with the second end secured to the connecting axle 17 to bias the housing and associated flexible web 18 mounted to the housing 11 in a furled oriented about the housing 11. A rib member 19 is mounted to a distal end of the flexible web spaced from the housing, with the rib member 19 including a handle 20 mounted thereon. Parallel slots 21 are directed through the flexible web 18 orthogonally oriented relative to the rib member 19 and substantially parallel to the web sides 22. The web slots 21 are each arranged to receive a seat belt member therethrough, such as indicated in FIG. 6. A hook member 23 is provided for fixed securement to the vehicular seat front panel 24 to enhance the extension of the web relative to the housing 11.

A first hook and loop fastener patch 26, as indicated in FIG. 6, is mounted to the web between the slots 21 and the rib 19 for adherence of a game board web 27, having a second hook and loop fastener patch 28 for securement to the first hook and loop fastener patch to permit individuals in such a vehicular rear seat structure to enjoy various games such as checkers and the like in use of the apparatus.

Figure 7:
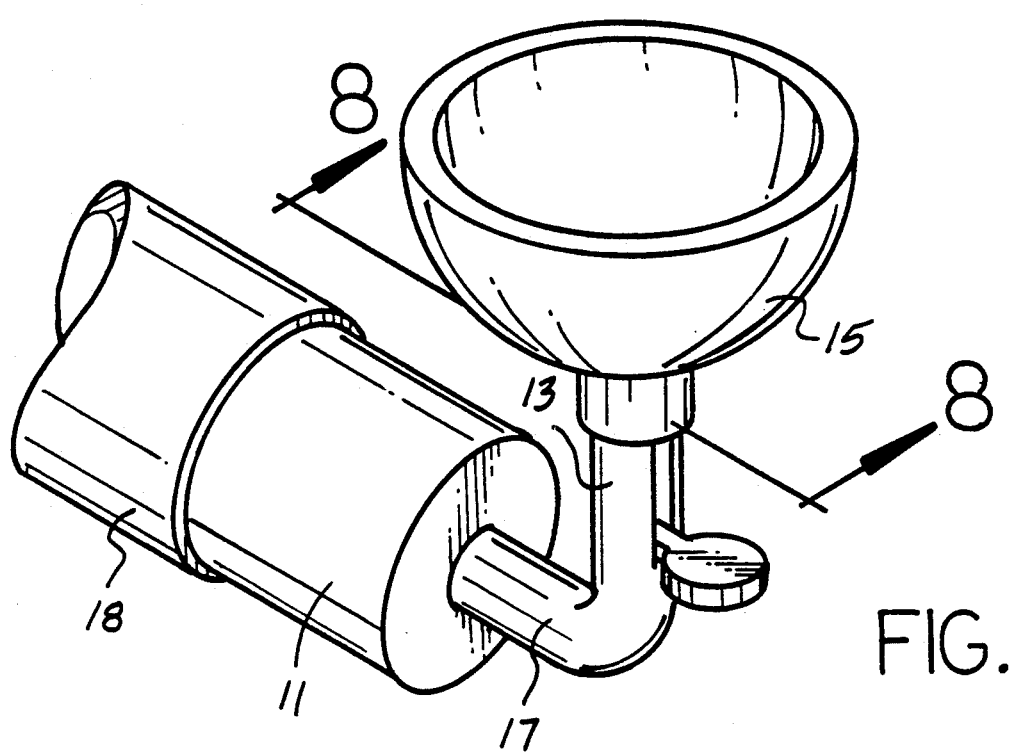
FIG. 7 is an isometric illustration of a modified suction cup structure.
Figure 8:
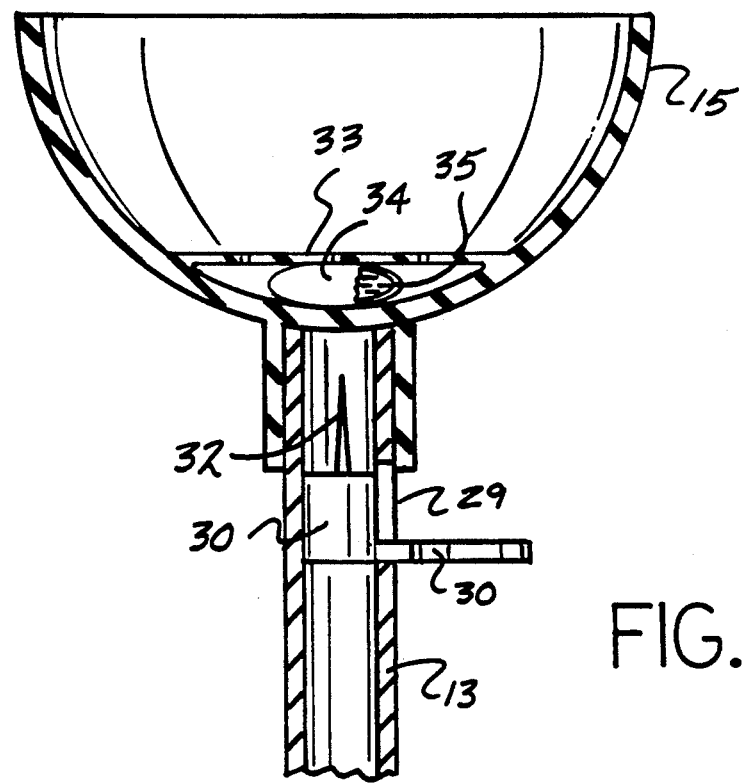
FIG. 8 is an orthographic view, taken along the lines 8—8 of FIG. 7 in the direction indicated by the arrows.

The FIGS. 7 and 8 includes the use of the support rods 12 and 13 to further each include a guide slot 29, having a lever plate 30 reciprocatably directed through the guide slot, with the lever plate including a piston 31 mounted within the rod structure. The piston 31 includes a projection pin 32 oriented towards the suction cup structure, with the suction cup having a flexible capsule 34 containing a fluid adhesive 35 therewithin mounted between an apertured web 33 and the associated support rod such that directing the projection pin 32 towards the flexible capsule 34 punctures the capsule directing the fluid adhesive 35 through the apertured web 33 onto the vehicular window "W" to insure securement of the suction cup members to the vehicular window in use.

As to the manner of usage and operation of the instant invention, the same should be apparent from the above disclosure, and accordingly no further discussion relative to the manner of usage and operation of the instant invention shall be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed as being new and desired to be protected by letters patent of the United States is as follows:

1. A retractable seat cover apparatus, comprising, a support axle, and a support housing rotatably mounted about the support axle, and the support axle having an axle first end spaced from an axle second end, with the axle first end including a first support rod fixedly mounted to the axle first end, and a second support rod fixedly mounted to the axle second end, the first support rod including a first suction cup, the second support rod including a second suction clip, with the first suction cup and the second suction cup arranged for adherence to a vehicular rear window, and biasing means mounted within the housing secured to the housing and to the support axle for biasing the housing in a first orientation about a support axle, with a flexible web mounted to the housing, with the flexible web arranged in a furled configuration in the first position, and the flexible web arranged in an extended orientation relative to the housing in a second position, and a fixed rib mounted to the flexible web in a spaced parallel relationship relative to the housing at a free distal end of the flexible web, with a handle mounted to the rib, and a plurality of parallel slots orthogonally oriented relative to the rib directed through the flexible web for receiving seat belt members therethrough.

2. An apparatus as set forth in claim 1 including a first hook and loop fastener patch mounted to the flexible web between the handle and the slots, and a flexible game board member having a second hook and loop fastener patch, with the second hook and loop fastener patch arranged for securement to the first hook and loop fastener patch.

3. An apparatus as set forth in claim 2 including a hook member arranged for securement to a vehicular seat in a spaced relationship relative to the window for receiving the handle member therethrough.

4. An apparatus as set forth in claim 3 wherein at least one support rod of said first support rod and said second support rod includes a tubular cavity therewithin, and a slot directed through the support rod in communication with the tubular cavity, and a lever plate directed through the slot in a slidable relationship, and a piston mounted within the tubular cavity, the piston including a pointed projection oriented between the piston and a free distal end of the support rod, and the support rod including at least said second suction cup member mounted thereon, wherein the second suction cup member includes an apertured web positioned in spaced adjacency to the support rod, with a flexible capsule mounted between the apertured web and the support rod, with the flexible web having a fluid adhesive contained therewithin, whereupon directing the pointed projection towards the flexible capsule effects expressing the fluid adhesive through the apertured web for adherence to the vehicular window.

* * * * *